United States Patent
Lin et al.

(10) Patent No.: US 12,026,973 B2
(45) Date of Patent: Jul. 2, 2024

(54) ELECTRONIC DEVICE AND IDENTITY AUTHENTICATION METHOD

(71) Applicant: VIVO MOBILE COMMUNICATION CO., LTD., Guangdong (CN)

(72) Inventors: Huaxin Lin, Dongguan (CN); Tong Cheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 82 days.

(21) Appl. No.: 18/148,571

(22) Filed: Dec. 30, 2022

(65) Prior Publication Data

US 2023/0154231 A1 May 18, 2023

Related U.S. Application Data

(63) Continuation of application No. PCT/CN2021/104003, filed on Jul. 1, 2021.

(30) Foreign Application Priority Data

Jul. 3, 2020 (CN) .......................... 202010631875.7

(51) Int. Cl.
*G06V 40/13* (2022.01)
*G06F 21/32* (2013.01)
(Continued)

(52) U.S. Cl.
CPC .......... *G06V 40/1394* (2022.01); *G06F 21/32* (2013.01); *G06V 10/141* (2022.01);
(Continued)

(58) Field of Classification Search
CPC ............. G06V 40/1394; G06V 10/141; G06V 40/1318; G06V 40/1365; G06V 40/1388; G06F 21/32; H10K 59/65; G02B 5/201
See application file for complete search history.

(56) References Cited

U.S. PATENT DOCUMENTS 10,515,992 B2  12/2019  Kim et al.
10,943,083 B2   3/2021  Yao et al.
(Continued)

FOREIGN PATENT DOCUMENTS

CN    103679152 A    3/2014
CN    109255285 A    1/2019
(Continued)

OTHER PUBLICATIONS

Extended European Search Report for European Patent Application No. 21831901.0, dated Oct. 13, 2023.
(Continued)

*Primary Examiner* — Antonio Xavier
(74) *Attorney, Agent, or Firm* — Harness, Dickey & Pierce, P.L.C.

(57) ABSTRACT

An electronic device includes a light emitting assembly, a fingerprint chip, and a plurality of color filters. The light emitting assembly is disposed between encapsulation glass and a glass substrate of a display of the electronic device; the fingerprint chip is provided with a plurality of filter sub-regions that are spaced apart from each other; and the plurality of color filters are disposed between the display and the plurality of filter sub-regions respectively.

20 Claims, 5 Drawing Sheets

(51) Int. Cl.
  *G06V 10/141* (2022.01)
  *G06V 40/12* (2022.01)
  *H10K 59/65* (2023.01)
  *G02B 5/20* (2006.01)

(52) U.S. Cl.
  CPC ...... *G06V 40/1318* (2022.01); *G06V 40/1365* (2022.01); *G06V 40/1388* (2022.01); *H10K 59/65* (2023.02); *G02B 5/201* (2013.01)

(56) References Cited

U.S. PATENT DOCUMENTS

| | | | |
|---|---|---|---|
| 11,048,910 B2 | 6/2021 | Li et al. | |
| 2019/0019000 A1* | 1/2019 | Lee | G02B 5/204 |
| 2019/0213312 A1* | 7/2019 | Tussy | G06Q 20/3276 |
| 2020/0193138 A1 | 6/2020 | Li et al. | |

FOREIGN PATENT DOCUMENTS

| | | |
|---|---|---|
| CN | 109313706 A | 2/2019 |
| CN | 110046564 A | 7/2019 |
| CN | 210091193 U | 2/2020 |
| CN | 111133446 A | 5/2020 |
| CN | 111178335 A | 5/2020 |
| CN | 111881766 A | 11/2020 |
| WO | WO-2019105228 A1 | 6/2019 |

OTHER PUBLICATIONS

International Search Report and Written Opinion of the International Searching Authority regarding International Patent Application No. PCT/CN2021/104003, dated Sep. 18, 2021. Translation provided by Bohui Intellectual Property.

\* cited by examiner

ELECTRONIC DEVICE AND IDENTITY AUTHENTICATION METHOD

CROSS-REFERENCE TO RELATED APPLICATIONS

This application is a Bypass Continuation application of PCT/CN2021/104003, filed on Jul. 1, 2021, which claims priority to Chinese Patent Application No. 202010631875.7, filed on Jul. 3, 2020, which are incorporated herein by reference in their entirety.

TECHNICAL FIELD

This disclosure pertains to the field of electronic devices, and specifically, relates to an electronic device and an identity authentication method.

BACKGROUND

It is a quick and accurate identity authentication method to perform identity authentication on an electronic device using fingerprints. However, currently, there are lawbreakers who make artificial fingerprints according to pattern information of fingerprints to impersonate authorized users for identity authentication, which brings about huge information security risks to users whose fingerprints have been faked.

Therefore, a technical solution is needed to resolve the problem of low security in identity authentication using fingerprints.

SUMMARY

Embodiments of the present disclosure provide an electronic device and an identity authentication method.

According to a first aspect, an embodiment of the present disclosure provides an electronic device. The electronic device includes a light emitting assembly, a fingerprint chip, and a plurality of color filters, where the light emitting assembly is disposed between encapsulation glass and a glass substrate of a display of the electronic device;

the fingerprint chip is provided with a plurality of filter sub-regions that are spaced apart from each other; and the plurality of color filters are disposed between the display and the plurality of filter sub-regions respectively.

According to a second aspect, an embodiment of the present disclosure provides an identity authentication method applied to the electronic device according to the first aspect. The method includes:

in response to an identity authentication trigger operation, controlling the light emitting assembly to emit light;

obtaining light intensity information corresponding to a target fingerprint and first pattern information of the target fingerprint, where the light intensity information is light intensity information of reflected light which passes through the plurality of color filters and reaches the fingerprint chip after the target fingerprint reflects the light; generating, based on the light intensity information, first spectrum information corresponding to the target fingerprint; and performing user identity authentication according to the first spectrum information, the first pattern information, and prestored second spectrum information and second pattern information for user identity authentication.

According to a third aspect, an embodiment of the present disclosure provides an electronic device. The electronic device includes a processor, a memory, and a program or instructions stored in the memory and executable on the processor, where when the program or instructions are executed by the processor, the steps of the identity authentication method according to the second aspect are implemented.

According to a fourth aspect, an embodiment of the present disclosure provides a non-transitory computer readable storage medium, where the non-transitory computer readable storage medium stores a program or instructions, and when the program or instructions are executed by a processor, the steps of the identity authentication method according to the second aspect are implemented.

According to a fifth aspect, an embodiment of the present disclosure provides a chip, where the chip includes a processor and a communications interface, the communications interface is coupled to the processor, and the processor is configured to execute a program or instructions to implement the steps of the identity authentication method according to the second aspect.

Figure 1:
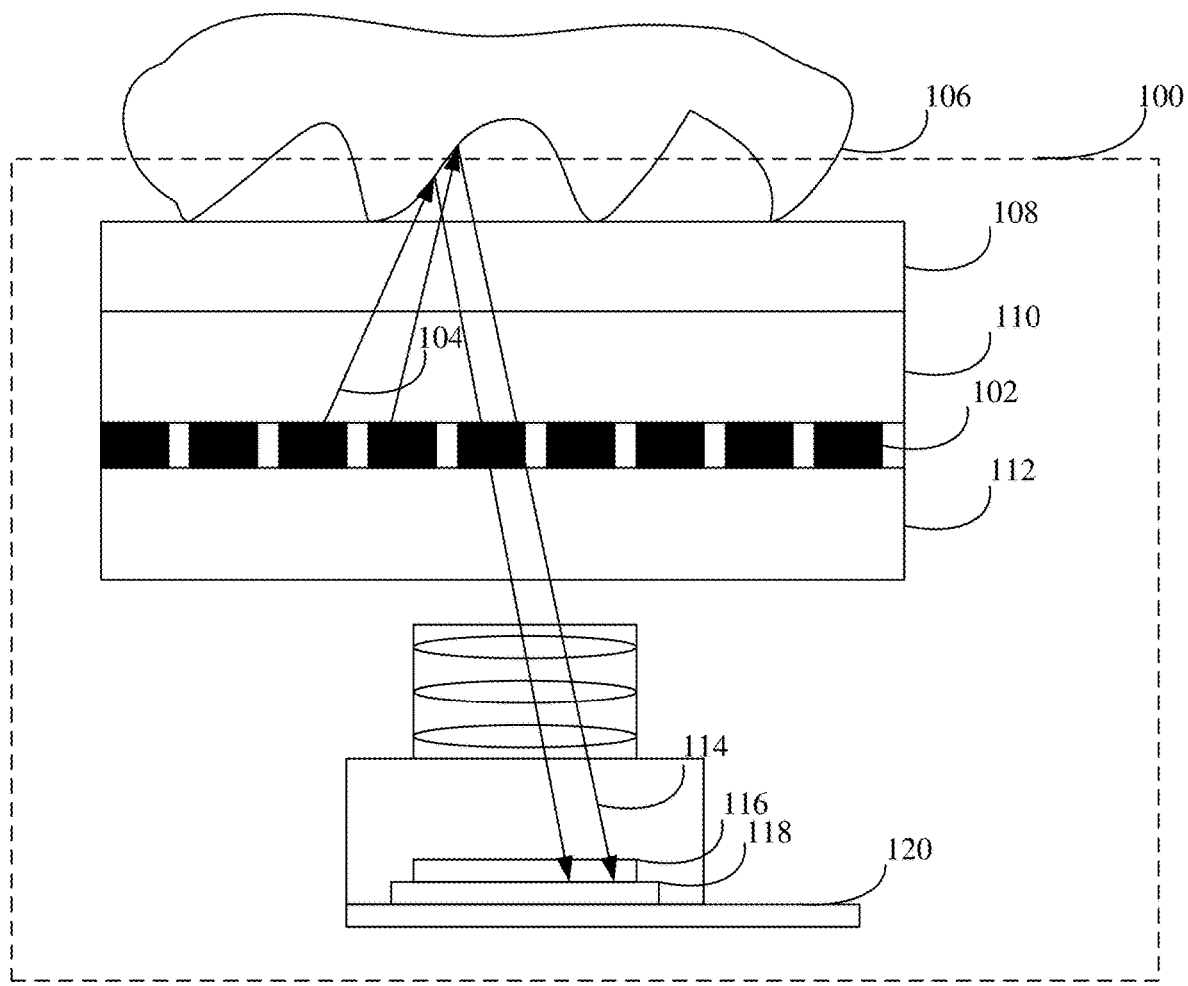
FIG. 1 is a schematic diagram of partial structure of an electronic device according to an embodiment of the present disclosure.

REFERENCE SIGNS electronic device 100, light emitting assembly 102, light 104, target fingerprint 106, glass cover 108, encapsulation glass 110, glass substrate 112, reflected light 114, color filter 116, fingerprint chip 118, and circuit board 120.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure shall fall within the protection scope of the present disclosure.

The terms "first", "second", and the like in this specification and claims of the present disclosure are used to distinguish between similar objects rather than to describe a specific order or sequence. It should be understood that data used in this way is interchangeable in appropriate circumstances so that the embodiments of the present disclosure can be implemented in other orders than the order illustrated or described herein. In addition, in this specification and claims, "and/or" indicates at least one of connected objects, and the character "/" generally indicates an "or" relationship between associated objects.

The following describes in detail an identity authentication method provided in the embodiments of the present disclosure through some embodiments and application scenarios thereof with reference to the accompanying drawings.

FIG. 1 is a schematic diagram of partial structure of an electronic device according to an embodiment of the present disclosure.

As shown in FIG. 1, the electronic device 100 includes a light emitting assembly 102, a fingerprint chip 118, and a plurality of color filters 116, where the light emitting assembly 102 is disposed between encapsulation glass 110 and a glass substrate 112 of a display of the electronic device 100; the fingerprint chip 118 is provided with a plurality of filter sub-regions that are spaced apart from each other; and the plurality of color filters 116 are disposed between the display and the plurality of filter sub-regions respectively.

In an illustrative embodiment, the light emitting assembly 102 is configured to emit light.

In an illustrative embodiment, the light emitting assembly 102 is independent RGB pixels. For example, the independent RGB pixels are located between the encapsulation glass 110 and the glass substrate 112 of the display of the electronic device 100. The independent RGB pixels are used to emit light. The display of the electronic device 100 includes a plurality of independent RGB pixels, and the plurality of independent RGB pixels correspond to red light, blue light, and green light respectively. The electronic device 100 controls emitting of light 104. The light 104 may be white light which is a mix of red light, blue light, and green light, or purple light which is a mix of red light and blue light, or yellow light which is a mix of red light and green light, or cyan light which is a mix of green light and blue light.

In an illustrative embodiment, the fingerprint chip 118 is a black and white chip configured to acquire reflected light 114 which passes through the plurality of color filters 116 after the light 104 emitted by the light emitting assembly 102 is incident on a target fingerprint 106 and reflected.

Figure 4:
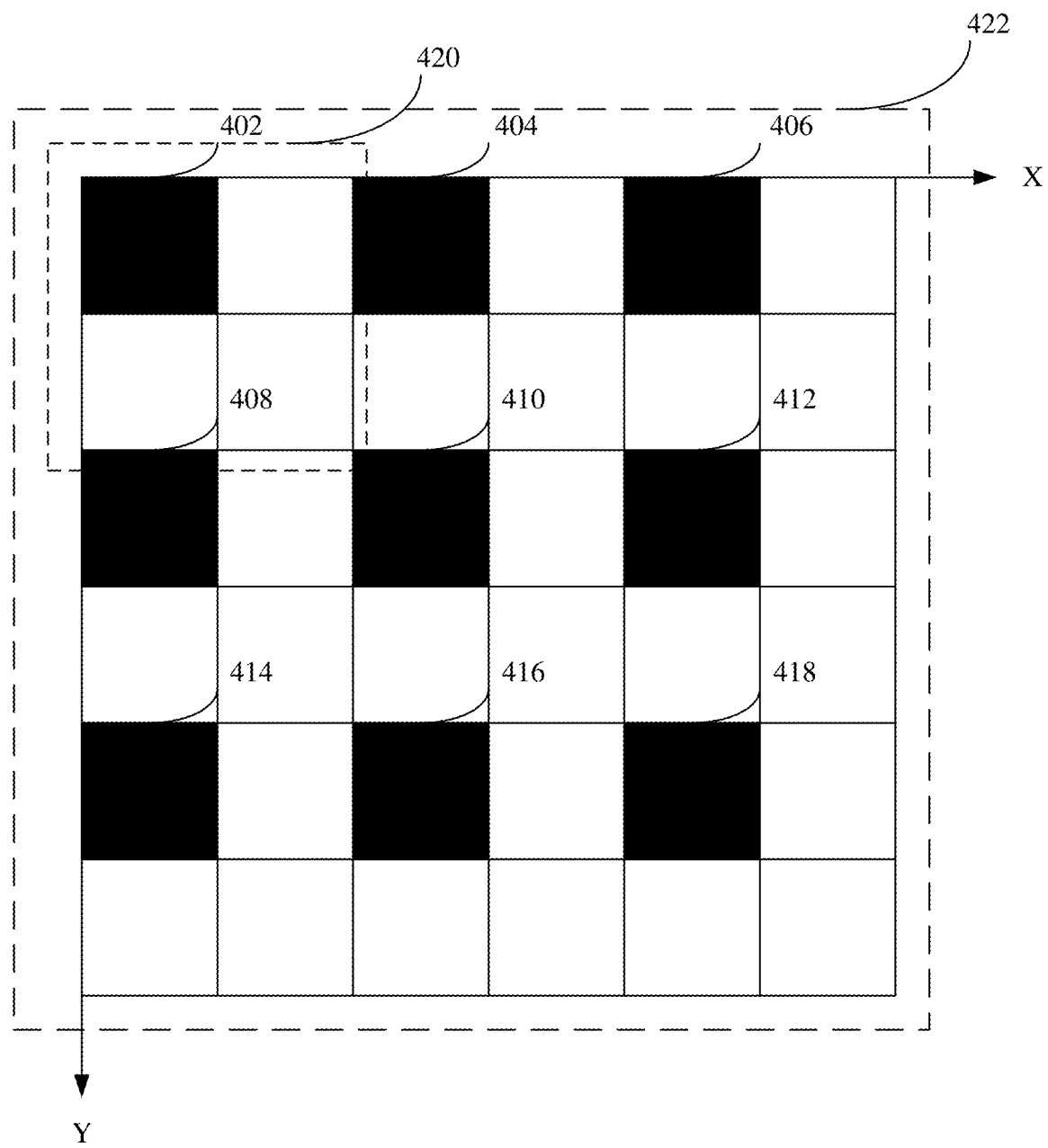
FIG. 4 is a schematic diagram of positional arrangement of color filters according to an embodiment of the present disclosure.

In an illustrative embodiment, as shown in FIG. 4, the filter sub-regions may be regions on the fingerprint chip corresponding to color filters 402, 404, 406, 408, 410, 412, 414, 416, and 418 respectively.

In an illustrative embodiment, the filter sub-regions being spaced apart from each other means that none of the filter sub-regions touches another. For example, as shown in FIG. 4, the filter sub-regions on the fingerprint chip corresponding to the color filters 402, 404, 406, 408, 410, 412, 414, 416, and 418 respectively are not touching one another.

In an illustrative embodiment, spectral bands of the color filters 116 are spectral bands predetermined according to RGB sub-pixel spectrums corresponding to the light 104 emitted by the light emitting assembly 102.

In an illustrative embodiment, the color filter 116, for example, a red filter, can absorb most of non-red light in mixed light and allows red light to pass through. The spectral band of the color filter 116 is a spectral band corresponding to a color of the color filter 116. For example, the red filter has a spectral band of 625 nanometers to 635 nanometers.

In an embodiment, assuming that the light 104 is white light which is a mix of red light, blue light, and green light, nine single-point wavelengths are selected. For the selection method, refer to FIG. 3. A peak wavelength of an independent RGB sub-pixel spectrum is determined as a fundamental wavelength. For example, a wavelength of a peak 320 of a B pixel spectrum is about 470 nanometers, and two single-point wavelengths adjacent to the fundamental wavelength are determined based on +/−20 nanometers predefined, such that 450 nanometers, 470 nanometers, and 490 nanometers are selected in the blue part. In the same way, 510 nanometers, 530 nanometers, and 550 nanometers are selected in the green part, and 610 nanometers, 630 nanometers, and 650 nanometers are selected in the red part. Thus, nine spectral bands are determined according to the nine single-point wavelengths and the predefined wavelength ranges. These spectral bands typically center at single-point wavelengths, for example, 445 nanometers to 455 nanometers, 465 nanometers to 475 nanometers, 485 nanometers to 495 nanometers, 505 nanometers to 515 nanometers, 525 nanometers to 535 nanometers, 545 nanometers to 555 nanometers, 605 nanometers to 615 nanometers, 625 nanometers to 635 nanometers, and 645 nanometers to 655 nanometers. Therefore, the spectral bands of the plurality of color filters 116 are the nine spectral bands determined according to a red pixel spectrum, a blue pixel spectrum, and a green pixel spectrum corresponding to the light 104, namely, 445 nanometers to 455 nanometers, 465 nanometers to 475 nanometers, 485 nanometers to 495 nanometers, 505 nanometers to 515 nanometers, 525 nanometers to 535 nanometers, 545 nanometers to 555 nanometers, 605 nanometers to 615 nanometers, 625 nanometers to 635 nanometers, and 645 nanometers to 655 nanometers.

In an illustrative embodiment, the plurality of color filters 116 are disposed between the display and the plurality of filter sub-regions respectively. For example, as shown in FIG. 4, the color filters 402, 404, 406, 408, 410, 412, 414, 416, and 418 are disposed between the display and the plurality of filter sub-regions on the fingerprint chip respectively.

In an illustrative embodiment, a preset quantity of filter sub-regions constitute a filter region, and the filter region is used for obtaining light intensity information of light which passes through the color filters 116 after the target fingerprint 106 reflects the light 104 emitted by the light emitting assembly 102.

For example, as shown in FIG. 4, the filter region is a large unit 422, and the preset quantity is nine. One large unit 422 includes nine filter sub-regions, namely, the regions on the fingerprint chip corresponding to the color filters 402, 404, 406, 408, 410, 412, 414, 416, and 418 respectively.

In an illustrative embodiment, color filters 116 corresponding to two of the filter sub-regions which belong to one filter region have different spectral bands.

For example, as shown in FIG. 4, the filter region is the large unit 422, and the preset quantity is nine. One large unit 422 includes nine filter sub-regions, namely, the regions on the fingerprint chip corresponding to the color filters 402, 404, 406, 408, 410, 412, 414, 416, and 418 respectively, and spectral bands of any two of the nine color filters differ.

In an illustrative embodiment, the light emitting assembly 102 in the display of the electronic device 100 emits the light 104, and the light 104 sequentially passes through the encapsulation glass 110 and a glass cover 108 and reaches the target fingerprint 106. The target fingerprint 106 absorbs part of the light 104 and reflects the rest, and the reflected light 114 sequentially passes through the glass cover 108, the encapsulation glass 110, the glass substrate 112, the color filters 116, and reaches the fingerprint chip 118. The color filters 116 adsorb part of the reflected light 114. The fingerprint chip 118 is connected to a circuit board 120.

In the electronic device embodiment shown in FIG. 1, an electronic device includes a light emitting assembly, a fingerprint chip, and a plurality of color filters, where the light emitting assembly is disposed between encapsulation glass and a glass substrate of a display of the electronic device; the fingerprint chip is provided with a plurality of filter sub-regions that are spaced apart from each other; and the plurality of color filters are disposed between the display and the plurality of filter sub-regions respectively. In the technical solutions of the embodiments of the present disclosure, the fingerprint chip acquires information about reflected light that passes through the plurality of color filters after light emitted by the light emitting assembly is incident on a target fingerprint and reflected. Therefore, authenticity of the target fingerprint can be verified in terms of pattern and spectrum, so as to identify artificially fake fingerprints, greatly improving security in identity authentication using fingerprints.

Figure 2:
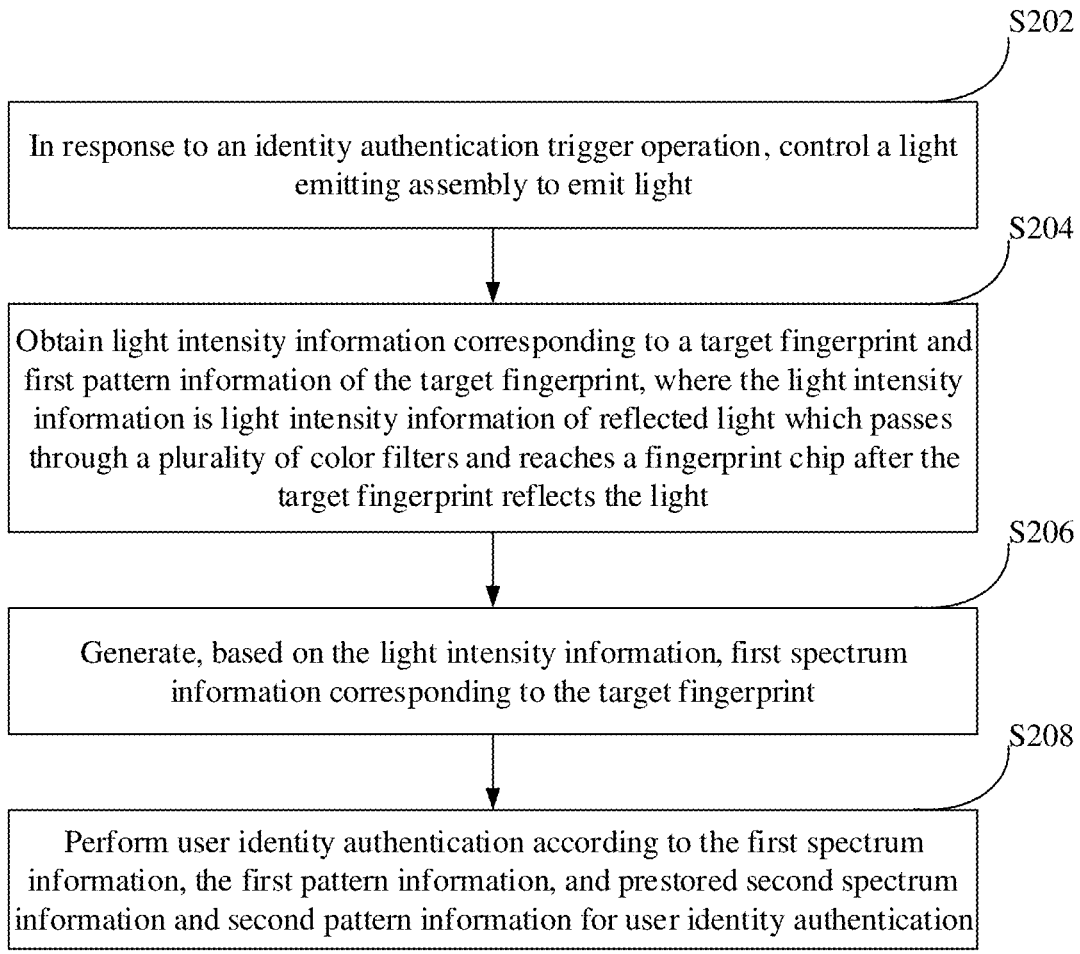
FIG. 2 is a schematic flowchart of an identity authentication method according to an embodiment of the present disclosure which is applicable to the electronic device shown in FIG. 1.

FIG. 2 is a schematic flowchart of an identity authentication method according to an embodiment of the present disclosure which is applicable to the electronic device shown in FIG. 1.

As shown in FIG. 2, in step S202, in response to an identity authentication trigger operation, a light emitting assembly is controlled to emit light.

In an illustrative embodiment, the identity authentication trigger operation may be a press operation performed on a predetermined region on a display of the electronic device, or a tap operation, touch-and-hold operation, or double-tap operation on a predetermined functional button of the electronic device, or other predetermined operations. The identity authentication trigger operation is not particularly limited in the present disclosure.

In an illustrative embodiment, a finger corresponding to a target fingerprint presses a predetermined fingerprint region, and the display of the electronic device emits white light which illuminates the finger.

In an illustrative embodiment, the display of the electronic device includes a plurality of independent RGB pixels, and the plurality of independent RGB pixels correspond to red light, blue light, and green light respectively. The electronic device controls the independent RGB pixel to emit light. The light may be white light which is a mix of red light, blue light, and green light, or purple light which is a mix of red light and blue light, or yellow light which is a mix of red light and green light, or cyan light which is a mix of green light and blue light.

In an illustrative embodiment, the fingerprint chip may be a black and white chip. A color filter, for example, a red filter, can absorb most of non-red light in mixed light and allow red light to pass through the color filter. A spectral band of the color filter is a spectral band corresponding to a color of the color filter. For example, a spectral band of the red filter is 625 nanometers to 635 nanometers. For an optionally position of the color filter, refer to FIG. 1. The color filters 116 are located between the fingerprint chip 118 and the glass substrate 112 of the display of the electronic device.

In an illustrative embodiment, white light which is a mix of red light, blue light, and green light is generally optionally light, and a usable spectral band of the light is about 440 nanometers to 700 nanometers. For a spectrogram of white light, refer to a white spectrum 310 in FIG. 3.

In an illustrative embodiment, because the white light is a mix of red light, blue light, and green light, nine single-point wavelengths are selected. For the selection method, refer to FIG. 3. A peak wavelength of an independent RGB sub-pixel spectrum is determined as a fundamental wavelength. For example, a wavelength of a peak 320 of a B pixel spectrum is about 470 nanometers, and two single-point wavelengths adjacent to the fundamental wavelength are determined based on +/−20 nanometers predefined, such that 450 nanometers, 470 nanometers, and 490 nanometers are selected in the blue part. In the same way, 510 nanometers, 530 nanometers, and 550 nanometers are selected in the green part, and 610 nanometers, 630 nanometers, and 650 nanometers are selected in the red part.

In an illustrative embodiment, if the light emitted as controlled by the electronic device is purple light which is a mix of red light and blue light, the purple light is a mix of two types of light, and thus six single-point wavelengths are selected. For example, a wavelength of a peak 320 of a B pixel spectrum is about 470 nanometers, and two single-point wavelengths adjacent to a fundamental wavelength are determined based on +/−15 nanometers predefined, meaning that 455 nanometers, 470 nanometers, and 485 nanometers are selected in the blue part. In the red part, 615 nanometers, 630 nanometers, and 645 nanometers are selected.

Figure 3:
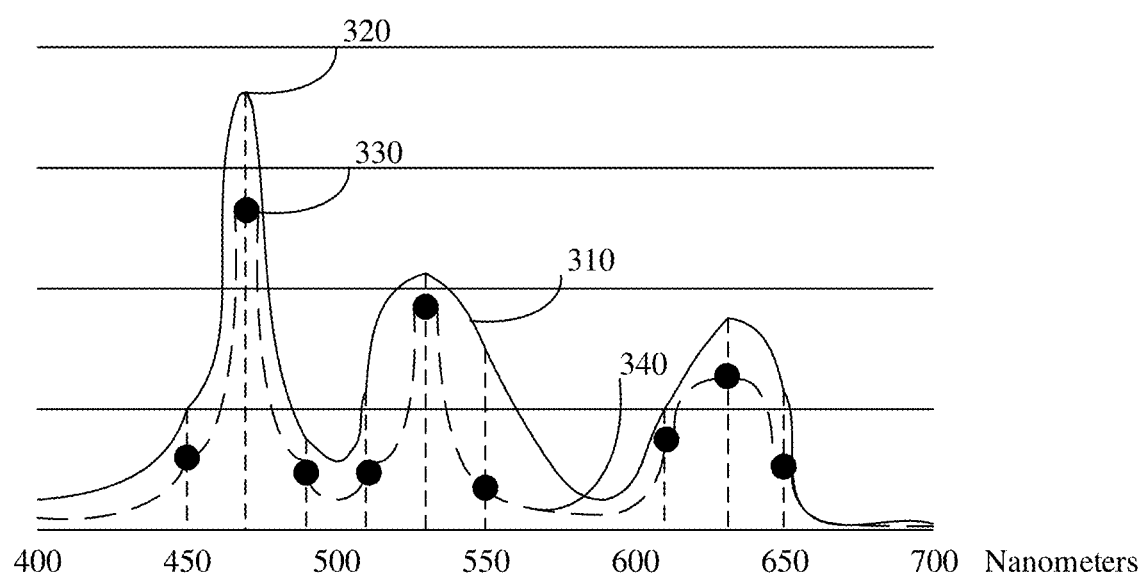
FIG. 3 is a schematic diagram of spectrum information according to an embodiment of the present disclosure.

In an illustrative embodiment, a predefined range, for example, +/−20 nanometers, for determining two single-point wavelengths adjacent to a fundamental wavelength may be determined according to a wavelength corresponding to half, or 1/3, or other predefined ratios of the peak of an independent RGB sub-pixel spectrum. As shown in FIG. 3, the horizontal coordinate of the white spectrum 310 is wavelength in nanometers, and the vertical coordinate is radiation capability of the light for which the unit of measurement is ignored. The wavelength of the peak 320 of the B pixel spectrum is about 470 nanometers, and radiation capability of light with a wavelength of 450 nanometers or 490 nanometers is ½ that of light with a wavelength of 470 nanometers.

In an illustrative embodiment, two single-point wavelengths adjacent to the wavelength of the peak 320 of the B pixel spectrum do not overlap or intersect with other single-point wavelengths. For example, 450 nanometers, 470 nanometers, and 490 nanometers are selected in the blue part, 510 nanometers, 530 nanometers, and 550 nanometers are selected in the green part, and 490 nanometers selected in the blue part is definitely less than the three single-point wavelengths in the green part.

In an illustrative embodiment, the light emitted by the display of the electronic device may alternatively be a mix of light of other colors rather than red, blue, and green. Color of the light is not specifically limited in the present disclosure. The display of the electronic device may be an organic light-emitting diode (OLED) display or other displays.

In an illustrative embodiment, in a case that the light emitted by the electronic device is white light, nine single-point wavelengths are determined. Nine spectral bands are determined according to the nine single-point wavelengths and predefined wavelength ranges. These spectral bands generally center at single-point wavelengths, for example, 445 nanometers to 455 nanometers, 465 nanometers to 475 nanometers, 485 nanometers to 495 nanometers, 505 nanometers to 515 nanometers, 525 nanometers to 535 nanometers, 545 nanometers to 555 nanometers, 605 nanometers to 615 nanometers, 625 nanometers to 635 nanometers, and 645 nanometers to 655 nanometers. The plurality of spectral bands have no overlapping wavelength ranges.

In an illustrative embodiment, there are gaps between every two of the plurality of color filters. As shown in FIG.

Figure 5:
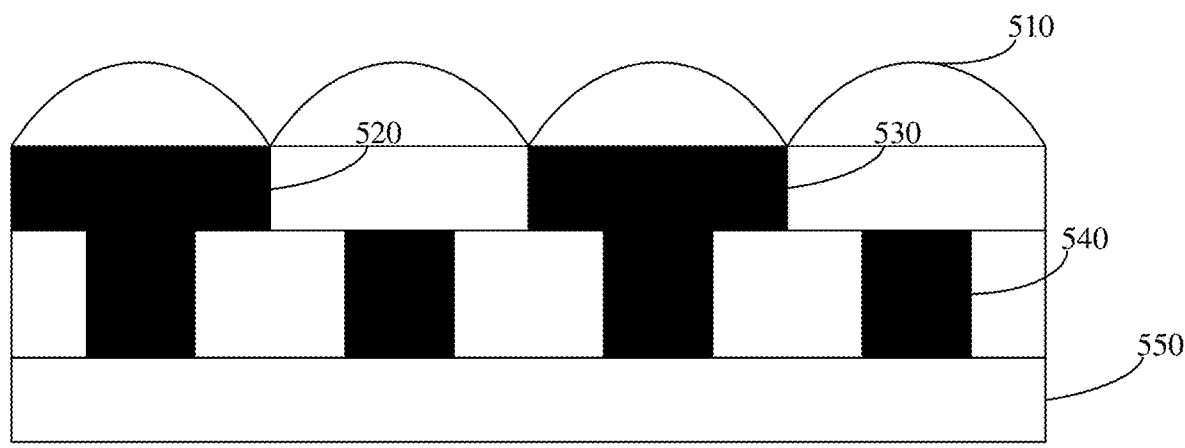
FIG. 5 is a schematic diagram of partial cross-sectional view of an electronic device according to an embodiment of the present disclosure which is capable of implementing an identity authentication method.

4, the color filters 402, 404, 406, 408, 410, 412, 414, 416, and 418 are located above predetermined regions of the fingerprint chip respectively. Spectral bands of the nine color filters are the nine predetermined spectral bands respectively. "Above" herein refers to a direction pointing from the fingerprint chip to the outside of the display of the electronic device. As shown in FIG. 5, a gap is present between color filters 520 and 530.

In an illustrative embodiment, the color filter may be rectangular, circular, or diamond. Shape of the color filter is not limited in the present disclosure. The color filters may also be distributed in a different shape than shown in FIG. 4 and FIG. 5, and are distributed in other predefined shapes, provided that corresponding regions of the fingerprint chip below the plurality of color filters are spaced apart from each other.

In step S204, light intensity information corresponding to the target fingerprint and first pattern information of the target fingerprint are obtained, where the light intensity information is light intensity information of reflected light which passes through the plurality of color filters and reaches the fingerprint chip after the target fingerprint reflects the light.

In an illustrative embodiment, the display of the electronic device emits white light to illuminate a finger corresponding to the target fingerprint, and the light is reflected by the finger, passes through the display again and then through a camera and the plurality of color filters, and reaches the fingerprint chip.

In an illustrative embodiment, there are human tissues such as blood vessels and bones under skin of the finger, and when the white light is incident on the finger, the finger absorbs part of the white light which is a mix of red light, green light, and blue light, and then reflects the rest. An apparatus for artificially faking fingerprints takes a fingerprint of a person as a template, and is shaped with a plastic material such as silicone. Such apparatus copies only pattern information of the fingerprint without considering biological features of the living body fingerprint. When the white light is incident on the apparatus for artificially faking fingerprints, the apparatus also absorbs part of the white light, and then reflects the rest. However, spectrum information of the reflected light reflected by the living body fingerprint is obviously greatly different from that of the reflected light reflected by the apparatus for artificially faking fingerprints.

In an illustrative embodiment, the plurality of color filters correspond to a plurality of predetermined spectral bands respectively. When reflected light passes through a color filter, most of light not in the spectral band is absorbed by the color filter while light of that spectral band passes through the color filter and reaches the fingerprint chip, and the fingerprint chip receives light intensity of the light of the spectral band. For example, nine spectral bands are predetermined, thirty-six color filters are disposed above predetermined regions of the fingerprint chip, and each nine color filters with different spectral bands are put into one large unit. Totally four large units are disposed above the fingerprint chip. "Above" herein refers to a direction pointing from the fingerprint chip to the outside of the display of the electronic device. For a green filter with a spectral band of 527 nanometers to 533 nanometers, most of red light and blue light in the reflected light is absorbed by the green filter, and green light with a wavelength of 527 nanometers to 533 nanometers can pass through the green filter and reach the fingerprint chip. The fingerprint chip can obtain light intensity information of the green light with a wavelength of 527 nanometers to 533 nanometers. Similarly, the fingerprint chip can obtain light intensity information of light of nine different spectral bands.

In step S206, first spectrum information corresponding to the target fingerprint is generated based on the light intensity information.

In an illustrative embodiment, generating, based on the light intensity information, first spectrum information corresponding to the target fingerprint includes: generating, based on light intensity information of reflected light of a plurality of spectral bands and the plurality of spectral bands, a spectral curve as the first spectrum information corresponding to the target fingerprint.

In an illustrative embodiment, as shown in FIG. 3, based on light intensity information 330 acquired by the fingerprint chip when the reflected light passes through a blue filter with a spectral band of 465 nanometers to 475 nanometers and reaches the fingerprint chip, and other eight pieces of light intensity information obtained under the same principle, a curve 340 can be drawn. The curve 340 can reflect spectrum information corresponding to the target fingerprint, and is determined as the first spectrum information.

In an illustrative embodiment, a curve generated based on nine points is not necessarily accurate spectrum information of the reflected light, but is enough for determining whether the spectrum information matches prestored second spectrum information for user identity authentication.

In step S208, user identity authentication is performed according to the first spectrum information, the first pattern information, and prestored second spectrum information and second pattern information for user identity authentication.

In an illustrative embodiment, the performing user identity authentication according to the first spectrum information, the first pattern information, and prestored second spectrum information and second pattern information for user identity authentication includes: determining whether the target fingerprint is a living body fingerprint, according to the first spectrum information and the prestored second spectrum information for user identity authentication; determining whether the first pattern information matches the second pattern information, according to the first pattern information and the prestored second pattern information for user identity authentication; and if the target fingerprint is a living body fingerprint and the first pattern information matches the second pattern information, determining that the user identity authentication is successful; or otherwise, determining that the user identity authentication is unsuccessful.

In an illustrative embodiment, the determining whether the first pattern information matches the second pattern information, according to the first pattern information and the prestored second pattern information for user identity authentication, may be: determining pattern similarity between the first pattern information and the second pattern information according to the first pattern information and the second pattern information; and if the pattern similarity is greater than or equal to a preset pattern similarity threshold, determining that the first pattern information matches the second pattern information; or if the pattern similarity is less than the preset pattern similarity threshold, determining that the first pattern information does not match the second pattern information. The preset pattern similarity threshold is generally high, for example, 90%.

In an illustrative embodiment, the determining whether the first pattern information matches the second pattern information, according to the first pattern information and the prestored second pattern information for user identity authentication, may alternatively be: determining whether the first pattern information matches the second pattern information, according to feature points of the first pattern information and feature points of the second pattern information.

In an illustrative embodiment, the determining whether the target fingerprint is a living body fingerprint, according to the first spectrum information and the prestored second spectrum information for user identity authentication, includes: determining similarity between the first spectrum information and the second spectrum information according to the first spectrum information and the pre stored second spectrum information for user identity authentication; and if the similarity is greater than or equal to a preset similarity threshold, determining that the target fingerprint is a living body fingerprint; or if the similarity is less than the preset similarity threshold, determining that the target fingerprint is not a living body fingerprint.

In an illustrative embodiment, the first spectrum information corresponding to the target fingerprint is obtained, and matching is performed between the first spectrum information obtained and spectrum information of an input fingerprint. If the similarity is low, for example, lower than 60%, the target fingerprint is determined not to be a living body fingerprint, and it is displayed on the screen that the user identity authentication is unsuccessful. If the similarity is high, for example, higher than or equal to 60%, the target fingerprint is determined to be a living body fingerprint. Generally, the preset similarity threshold is low, for example, 60%.

In an illustrative embodiment, the electronic device may first determine whether the target fingerprint is a living body fingerprint, and then determine whether the first pattern information matches the second pattern information; or first determine whether the first pattern information matches the second pattern information, and then determine whether the target fingerprint is a living body fingerprint; or perform the determining processes simultaneously. This is not particularly limited in the present disclosure.

In an illustrative embodiment, the electronic device determines that the user identity authentication is successful, only when the target fingerprint is a living body fingerprint and the first pattern information matches the second pattern information. In other cases, the electronic device determines that the user identity authentication is unsuccessful.

In an illustrative embodiment, the user identity authentication based on fingerprint identification may be applied to scenarios of unlocking electronic devices. Optionally, after the electronic device determines that the user identity authentication is successful according to the fingerprint, the electronic device unlocks user permissions to allow a user corresponding to the target fingerprint to use most of functions of the electronic device. For example, if a mobile phone determines, according to fingerprint identification, that a user corresponding to a target fingerprint is a user of the mobile phone, the mobile phone determines that user identity authentication is successful and disables lockscreen protection so that the user is able to use the mobile phone to conduct various activities such as making a call, surfing the internet, and playing games. If the mobile phone determines, according to fingerprint identification, that the user corresponding to the target fingerprint is not a user of the mobile phone, the mobile phone determines that user identity authentication is unsuccessful and still retains the lockscreen protection state where the user is unable to use most of functions of the mobile phone.

In an illustrative embodiment, when the target fingerprint is not a living body fingerprint and the first pattern information matches the second pattern information, it is obvious that the target fingerprint is an artificially fake fingerprint used by an unauthorized user who tries to impersonate someone else for user identity authentication, which brings about huge information security risks and economic risks to the one whose fingerprint has been faked. An artificially fake fingerprint takes a fingerprint of a person as a template, and is shaped with a plastic material such as silicone. Artificially fake fingerprints made in such way can crack an automated fingerprint identification system that is based on a traditional optical acquisition instrument. Different from fake fingerprints, skin of a human body has unique absorption and scattering features. Artificially fake fingerprints can copy pattern information of real fingerprints, but have no living features of the human body.

In an illustrative embodiment, when the target fingerprint is a living body fingerprint and the first pattern information does not match the second pattern information, it means that a user corresponding to the target fingerprint is a user other than a user satisfying user identity authentication requirements, and thus the user identity authentication is unsuccessful.

In an illustrative embodiment, when the target fingerprint is not a living body fingerprint and the first pattern information does not match the second pattern information, it may be the result of an artificially fake fingerprint used or a mis-operation by a user, and thus the user identity authentication is unsuccessful.

Optionally, in an illustrative embodiment, if the target fingerprint is determined not to be a living body fingerprint for consecutively a preset quantity of times, switching is performed to a password-based user identity authentication mode. For example, if the target fingerprint is determined not to be a living body fingerprint for consecutively three times, the electronic device directly turns off a fingerprint identification function, and displays "Please enter password to unlock" on its screen. If the target fingerprint is determined not to be a living body fingerprint for consecutively a preset quantity of times, it means that an unauthorized user is possibly deliberately trying to crack the fingerprint identification-based user identity authentication mode. In this case, the fingerprint identification-based user identity authentication mode is subject to high risks. Therefore, it is necessary to turn off the fingerprint identification function and switch to another user identity authentication mode.

In an illustrative embodiment, if the target fingerprint is determined not to be a living body fingerprint for consecutively the preset quantity of times, switching may be performed alternatively to a facial recognition-based user identity authentication mode, a voice recognition-based user identity authentication mode, a user identity authentication mode based on dynamic mobile phone verification code, or the like. The new user identity authentication mode is not particularly limited in the present disclosure.

In an illustrative embodiment, if the target fingerprint is determined not to be a living body fingerprint for consecutively the preset quantity of times, switching may be performed alternatively to a user identity authentication prohibited mode for a preset time range. For example, if the target fingerprint is determined not to be a living body fingerprint for consecutively three times, the electronic device is unable to use user identity authentication within 24 hours, and is able to use user identity authentication again only after 24 hours.

In an illustrative embodiment, before this identity authentication method is used, a user of the electronic device launches a fingerprint input interface and uses a finger to press a fingerprint region, the display of the electronic device emits white light to illuminate the finger, and the light is reflected by the finger, passes through the display again and then through a camera, and reaches the fingerprint chip. The fingerprint chip generates spectrum information corresponding to the fingerprint, where the spectrum information is the prestored second spectrum information for user identity authentication; and the fingerprint chip outputs pattern information of the fingerprint, where the pattern information is the prestored second pattern information for user identity authentication. The second spectrum information and the second pattern information are stored in the electronic device.

In the embodiments of the identity authentication method shown in FIG. 2, first, in response to an identity authentication trigger operation, the light emitting assembly is controlled to emit light; then, light intensity information corresponding to a target fingerprint and first pattern information of the target fingerprint are obtained, where the light intensity information is light intensity information of reflected light which passes through the plurality of color filters and reaches the fingerprint chip after the target fingerprint reflects the light; then, based on the light intensity information, first spectrum information corresponding to the target fingerprint is generated; and finally, according to the first spectrum information, the first pattern information, and prestored second spectrum information and second pattern information for user identity authentication, user identity authentication is performed. According to the embodiments of the present disclosure, light can be emitted to illuminate a target fingerprint, light intensity information and first pattern information are obtained, and first spectrum information is generated. User identity authentication is performed through verification of both the first spectrum information and the first pattern information. Thus, artificially fake fingerprints can be identified, greatly improving security in identity authentication using fingerprints.

FIG. 3 is a schematic diagram of spectrum information according to an embodiment of the present disclosure.

As shown in FIG. 3, the spectrogram 310 is a spectrogram of white light which is a mix of red light (R pixels), blue light (B pixels), and green light (G pixels). A wavelength of a peak 320 of a B pixel spectrum is about 470 nanometers, and two single-point wavelengths adjacent to the fundamental wavelength are determined based on +/−20 nanometers predefined, such that 450 nanometers, 470 nanometers, and 490 nanometers are selected in the blue part. In the same way, 510 nanometers, 530 nanometers, and 550 nanometers are selected in the green part, and 610 nanometers, 630 nanometers, and 650 nanometers are selected in the red part.

In an illustrative embodiment, the light intensity information 330 is light intensity information of light of a spectral band of 465 nanometers to 475 nanometers which is determined according to the wavelength of the peak 320 of the B pixel spectrum. It should be noted that in the process that the white light is incident on the finger and reflected, passes through the color filters, and reaches the fingerprint chip, light intensity information of the reflected light which reaches the fingerprint chip is definitely weaker than in the spectrogram of the white light. The curve 340 is a curve determined based on the light intensity information 330 and light intensity information of light of other eight spectral bands. The curve 340 can reflect spectrum information corresponding to the target fingerprint, that is, the first spectrum information.

FIG. 4 is a schematic diagram of positional arrangement of color filters according to an embodiment of the present disclosure.

As shown in FIG. 4, a direction X and a direction Y of the chip are defined, and a grid is formed accordingly, a 6*6 unit is taken as a large unit 422, and a 2*2 unit is taken as a small unit 420 in a large unit 422. A color filter with a spectral band of 445 nanometers to 455 nanometers is disposed above a square in the upper left corner of a small unit 420, and color filters with other eight spectral bands are disposed under the same principle. It should be noted that positions of the color filters with nine different spectral bands are interchangeable, which has no impact on the first spectrum information generated in subsequent steps. "Above" herein refers to a direction pointing from the fingerprint chip to the outside of the display of the electronic device. In addition, FIG. 3 shows only one large unit 422, and an actual fingerprint chip may be provided with a plurality of large units identical to the large unit 422.

In an illustrative embodiment, the color filters 402, 404, 406, 408, 410, 412, 414, 416, and 418 are located above predetermined regions of the fingerprint chip respectively. Spectral bands of the nine color filters are the nine predetermined spectral bands respectively, for example, 445 nanometers to 455 nanometers, 465 nanometers to 475 nanometers, 485 nanometers to 495 nanometers, 505 nanometers to 515 nanometers, 525 nanometers to 535 nanometers, 545 nanometers to 555 nanometers, 605 nanometers to 615 nanometers, 625 nanometers to 635 nanometers, and 645 nanometers to 655 nanometers.

FIG. 5 is a schematic diagram of partial cross-sectional view of an electronic device according to an embodiment of the present disclosure, where the electronic device is capable of implementing an identity authentication method.

As shown in FIG. 5, a color filter 520 and a color filter 530 are disposed below a plurality of microlenses 510, and the color filter 520 and the color filter 530, with a gap therebetween, correspond to different spectral bands. Photodiodes 540 are disposed below the color filter 520 and the color filter 530, and below the photodiodes 540 are a plurality of wiring layers 550. It should be noted that "below" herein refers to a direction pointing from the outside of the display of the electronic device to the fingerprint chip.

It should be noted that the identity authentication method provided in the embodiments of the present disclosure may be performed by an identity authentication apparatus or a control module for performing the identity authentication method in the identity authentication apparatus. In embodiments of the present disclosure, the identity authentication method being performed by an identity authentication apparatus is used as an example to describe the identity authentication method provided in the embodiments of the present disclosure.

Figure 6:
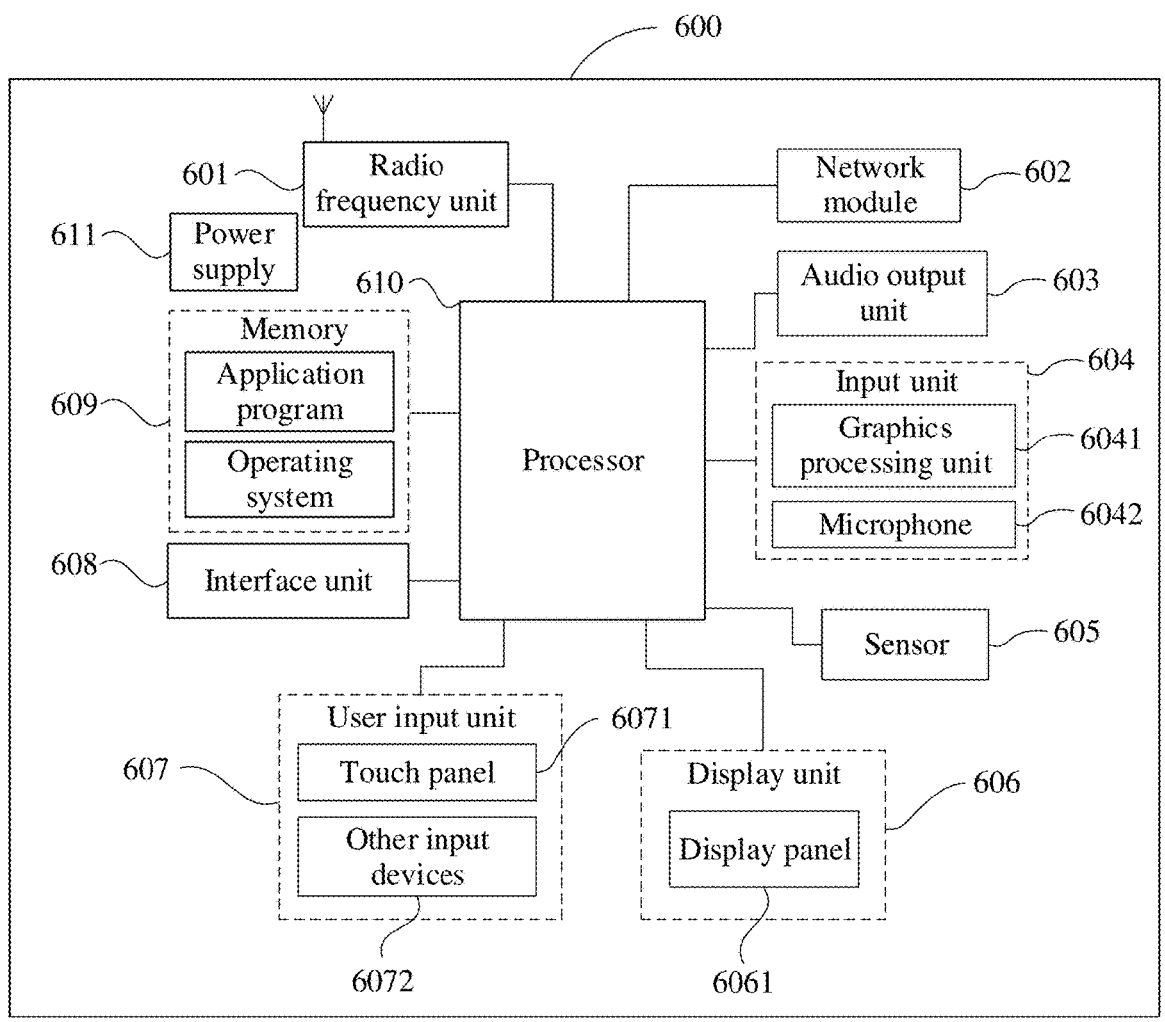
FIG. 6 is a schematic diagram of a hardware structure of an electronic device according to an embodiment of the present disclosure.

FIG. 6 is a schematic diagram of a hardware structure of an electronic device according to an embodiment of the present disclosure.

The electronic device 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the electronic device 100 may further include a power supply 611 (such as a battery) for supplying power to the components.

The power supply may be logically connected to the processor 610 via a power management system. In this way, functions such as charge management, discharge management, and power consumption management are implemented via the power management system. The electronic device structure shown in FIG. 6 does not constitute any limitation on the electronic device. The electronic device may include more or fewer components than shown in the figure, or combine some of the components, or have the components arranged differently, which are not further described herein.

The processor 610 is configured to implement the following steps: in response to an identity authentication trigger operation, controlling a light emitting assembly to emit light; obtaining light intensity information corresponding to a target fingerprint and first pattern information of the target fingerprint, where the light intensity information is light intensity information of reflected light which passes through a plurality of color filters and reaches a fingerprint chip after the target fingerprint reflects the light; generating, based on the light intensity information, first spectrum information corresponding to the target fingerprint; and performing user identity authentication according to the first spectrum information, the first pattern information, and prestored second spectrum information and second pattern information for user identity authentication.

In the embodiments of the present disclosure, first, in response to an identity authentication trigger operation, the light emitting assembly is controlled to emit light; then, light intensity information corresponding to a target fingerprint and first pattern information of the target fingerprint are obtained, where the light intensity information is light intensity information of reflected light which passes through the plurality of color filters and reaches the fingerprint chip after the target fingerprint reflects the light; then, based on the light intensity information, first spectrum information corresponding to the target fingerprint is generated; and finally, according to the first spectrum information, the first pattern information, and prestored second spectrum information and second pattern information for user identity authentication, user identity authentication is performed. According to the embodiments of the present disclosure, light can be emitted to illuminate a target fingerprint, light intensity information and first pattern information are obtained, and first spectrum information is generated. User identity authentication is performed through verification of both the first spectrum information and the first pattern information. Thus, artificially fake fingerprints can be identified, greatly improving security in identity authentication using fingerprints.

Optionally, the processor 610 is further configured to generate, based on the light intensity information, first spectrum information corresponding to the target fingerprint, which includes: generating, based on the light intensity information of reflected light of a plurality of spectral bands and the plurality of spectral bands, a spectral curve as the first spectrum information corresponding to the target fingerprint.

Optionally, the processor 610 is further configured to perform user identity authentication according to the first spectrum information, the first pattern information, and prestored second spectrum information and second pattern information for user identity authentication, which includes: determining whether the target fingerprint is a living body fingerprint, according to the first spectrum information and the prestored second spectrum information for user identity authentication; determining whether the first pattern information matches the second pattern information, according to the first pattern information and the prestored second pattern information for user identity authentication; and if the target fingerprint is a living body fingerprint and the first pattern information matches the second pattern information, determining that the user identity authentication is successful; or otherwise, determining that the user identity authentication is unsuccessful.

Optionally, the processor 610 is further configured to determine whether the target fingerprint is a living body fingerprint, according to the first spectrum information and the prestored second spectrum information for user identity authentication, which includes: determining similarity between the first spectrum information and the second spectrum information, according to the first spectrum information and the prestored second spectrum information for user identity authentication; and if the similarity is greater than or equal to a preset similarity threshold, determining that the target fingerprint is a living body fingerprint; or if the similarity is less than the preset similarity threshold, determining that the target fingerprint is not a living body fingerprint.

Optionally, the processor 610 is further configured to, if the target fingerprint is determined not to be a living body fingerprint for consecutively a preset quantity of times, switch to a password-based user identity authentication mode.

In the embodiments of the present disclosure, first spectrum information is generated based on light intensity information of reflected light of a plurality of spectral bands and the plurality of spectral bands. According to the first spectrum information, first pattern information, and prestored second spectrum information and second pattern information for user identity authentication, it is determined whether a target fingerprint is a living body fingerprint and whether the first pattern information matches the prestored information, and a user authentication result is determined based on the two determining results. Whether the target fingerprint is a living body fingerprint is determined according to a comparison of similarity between the first spectrum information and the second spectrum information against a preset similarity threshold, and if the target fingerprint is determined not to be a living body fingerprint for multiple times, switching of the user identity authentication mode is performed. With the embodiments of the present disclosure, first spectrum information can be obtained, and a user authentication result is determined based on double determining; and whether a target fingerprint is a living body fingerprint can be determined according to a comparison of similarity between two spectrum information against a preset similarity threshold. Thus, when an unauthorized user is obviously deliberately trying to crack fingerprint identification, the fingerprint identification function can be shut down, and identity authentication is performed in other manners, effectively improving security in user identity authentication.

It should be understood that in the embodiments of this disclosure, the input unit 604 may include a graphics processing unit (GPU) 6041 and a microphone 6042. The graphics processing unit 6041 processes image data of a static picture or a video that is obtained by an image capture apparatus (for example, a camera) in an image capture mode or a video capture mode. The display unit 606 may include a display panel 6061, and the display panel 6061 may be configured in a form of a liquid crystal display, an organic light-emitting diode display, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a functional button (such as a volume control button or a power on/off button), a trackball, a mouse, and a joystick, which are not further described herein. The memory 609 may be configured to store software programs and various data which include but are not limited to an application program and an operating system. The processor 610 may integrate an application processor and a modem processor. The application processor mainly processes an operating system, a user interface, an application program, and the like. The modem processor mainly processes wireless communication. It can be understood that the modem processor may alternatively be not integrated in the processor 610.

An embodiment of the present disclosure further provides a non-transitory computer readable storage medium, where the non-transitory computer readable storage medium stores a program or instructions, and when the program or instructions are executed by a processor, the processes of the foregoing embodiments of the identity authentication method are implemented, with the same technical effects achieved. To avoid repetition, details are not described herein again.

The processor is a processor in the electronic device in the foregoing embodiments. The non-transitory computer readable storage medium includes a computer read-only memory (ROM), a random access memory (RAM), a magnetic disk, or an optical disc.

An embodiment of the present disclosure further provides a chip, where the chip includes a processor and a communications interface. The communications interface is coupled to the processor, and the processor is configured to execute a program or instructions to implement the processes of the foregoing embodiments of the identity authentication method, with the same technical effects achieved. To avoid repetition, details are not described herein again.

It should be understood that the chip mentioned in this embodiment of the present disclosure may also be referred to as a system-level chip, a system chip, a chip system, a system-on-chip, or the like.

It should be noted that, in this specification, the terms "include", "comprise", or any of their variants are intended to cover a non-exclusive inclusion, such that a process, method, article, or apparatus that includes a series of elements not only includes those elements but also includes other elements that are not expressly listed, or further includes elements inherent to such process, method, article, or apparatus. In the absence of more restrictions, an element preceded by the statement "includes a . . . " does not preclude the presence of other identical elements in the process, method, article, or apparatus that includes the element. In addition, it should be noted that the scope of the method and apparatus in the implementations of the present disclosure is not limited to functions being performed in the order shown or discussed, and may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software with a necessary general hardware platform. Certainly, the method in the foregoing embodiments may alternatively be implemented by hardware. However, in many cases, the former is a preferred implementation. Based on such understanding, the technical solutions of the present disclosure essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The foregoing describes the embodiments of the present disclosure with reference to the accompanying drawings. However, the present disclosure is not limited to the foregoing specific implementations. These specific implementations are merely illustrative rather than restrictive. Inspired by the present disclosure, persons of ordinary skill in the art may develop many other forms which do not depart from the essence of the present disclosure and the protection scope of the claims, and all such forms shall fall within the protection scope of the present disclosure.

What is claimed is:

1. An electronic device, wherein the electronic device comprises a light emitting assembly, a fingerprint chip, and a plurality of color filters, wherein the light emitting assembly is disposed between encapsulation glass and a glass substrate of a display of the electronic device;
   the fingerprint chip is provided with a plurality of filter sub-regions that are spaced apart from each other;
   the plurality of color filters are disposed between the display and the plurality of filter sub-regions respectively; and
   wherein the plurality of color filters are directly above the fingerprint chip.

2. The electronic device according to claim 1, wherein spectral bands of color filters are spectral bands predetermined according to RGB sub-pixel spectrums corresponding to light emitted by the light emitting assembly.

3. The electronic device according to claim 1, wherein a preset quantity of filter sub-regions constitute a filter region, and the filter region is used for obtaining light intensity information of light which passes through color filters after a target fingerprint reflects light emitted by the light emitting assembly.

4. The electronic device according to claim 3, wherein color filters corresponding to two of the filter sub-regions which belong to one filter region have different spectral bands.

5. An identity authentication method, applied to an electronic device, wherein the electronic device comprises a light emitting assembly, a fingerprint chip, and a plurality of color filters, wherein the light emitting assembly is disposed between encapsulation glass and a glass substrate of a display of the electronic device;
   the fingerprint chip is provided with a plurality of filter sub-regions that are spaced apart from each other; and
   the plurality of color filters are disposed between the display and the plurality of filter sub-regions respectively; and
   wherein the plurality of color filters are directly above the fingerprint chip;
   wherein the method comprises:

in response to an identity authentication trigger operation, controlling the light emitting assembly to emit light;

obtaining light intensity information corresponding to a target fingerprint and first pattern information of the target fingerprint, wherein the light intensity information is light intensity information of reflected light which passes through the plurality of color filters and reaches the fingerprint chip after the target fingerprint reflects the light;

generating, based on the light intensity information, first spectrum information corresponding to the target fingerprint; and performing user identity authentication according to the first spectrum information, the first pattern information, and prestored second spectrum information and second pattern information for user identity authentication.

6. The method according to claim 5, wherein the generating, based on the light intensity information, the first spectrum information corresponding to the target fingerprint comprises:

generating, based on light intensity information of reflected light of a plurality of spectral bands and the plurality of spectral bands, a spectral curve as the first spectrum information corresponding to the target fingerprint.

7. A non-transitory computer readable storage medium, wherein the non-transitory computer readable storage medium stores a program or instructions, and when the program or instructions are executed by a processor, the method according to claim 6 is implemented.

8. A chip, wherein the chip comprises a processor and a communications interface, the communications interface is coupled to the processor, and the processor is configured to execute a program or instructions to implement the method according to claim 6.

9. The method according to claim 5, wherein the performing the user identity authentication according to the first spectrum information, the first pattern information, and the prestored second spectrum information and second pattern information for user identity authentication comprises:

determining whether the target fingerprint is a living body fingerprint, according to the first spectrum information and the prestored second spectrum information for user identity authentication;

determining whether the first pattern information matches the second pattern information, according to the first pattern information and the prestored second pattern information for user identity authentication; and if the target fingerprint is a living body fingerprint and the first pattern information matches the second pattern information, determining that the user identity authentication is successful; or if the target fingerprint is a living body fingerprint and the first pattern information does not match the second pattern information, or if the target fingerprint is not a living body fingerprint and the first pattern information matches the second pattern information, or if the target fingerprint is not a living body fingerprint and the first pattern information does not match the second pattern information, determining that the user identity authentication is unsuccessful.

10. The method according to claim 7, wherein the determining whether the target fingerprint is a living body fingerprint, according to the first spectrum information and the prestored second spectrum information for user identity authentication, comprises:

determining similarity between the first spectrum information and the second spectrum information according to the first spectrum information and the prestored second spectrum information for user identity authentication; and if the similarity is greater than or equal to a preset similarity threshold, determining that the target fingerprint is a living body fingerprint; or if the similarity is less than the preset similarity threshold, determining that the target fingerprint is not a living body fingerprint.

11. The method according to claim 8, wherein the method further comprises:

if the target fingerprint is determined not to be a living body fingerprint for consecutively a preset quantity of times, switching to a password-based user identity authentication mode.

12. A non-transitory computer readable storage medium, wherein the non-transitory computer readable storage medium stores a program or instructions, and when the program or instructions are executed by a processor, the method according to claim 9 is implemented.

13. A chip, wherein the chip comprises a processor and a communications interface, the communications interface is coupled to the processor, and the processor is configured to execute a program or instructions to implement the method according to claim 9.

14. A non-transitory computer readable storage medium, wherein the non-transitory computer readable storage medium stores a program or instructions, and when the program or instructions are executed by a processor, the method according to claim 5 is implemented.

15. A chip, wherein the chip comprises a processor and a communications interface, the communications interface is coupled to the processor, and the processor is configured to execute a program or instructions to implement the method according to claim 5.

16. An electronic device, comprising a light emitting assembly, a fingerprint chip, and a plurality of color filters, wherein the light emitting assembly is disposed between encapsulation glass and a glass substrate of a display of the electronic device;

the fingerprint chip is provided with a plurality of filter sub-regions that are spaced apart from each other; and the plurality of color filters are disposed between the display and the plurality of filter sub-regions respectively; and wherein the plurality of color filters are directly above the fingerprint chip; and the electronic device further comprises a memory, a processor, and a computer program stored in the memory and executable on the processor, wherein the computer program, when executed by the processor, causes the electronic device to perform:

in response to an identity authentication trigger operation, controlling the light emitting assembly to emit light;

obtaining light intensity information corresponding to a target fingerprint and first pattern information of the target fingerprint, wherein the light intensity information is light intensity information of reflected light which passes through the plurality of color filters and reaches the fingerprint chip after the target fingerprint reflects the light;

generating, based on the light intensity information, first spectrum information corresponding to the target fingerprint; and performing user identity authentication according to the first spectrum information, the first pattern information, and prestored second spectrum information and second pattern information for user identity authentication.

17. The electronic device according to claim 16, wherein the computer program, when executed by the processor, causes the electronic device to perform:
generating, based on light intensity information of reflected light of a plurality of spectral bands and the plurality of spectral bands, a spectral curve as the first spectrum information corresponding to the target fingerprint.

18. The electronic device according to claim 16, wherein the computer program, when executed by the processor, causes the electronic device to perform:
determining whether the target fingerprint is a living body fingerprint, according to the first spectrum information and the prestored second spectrum information for user identity authentication;
determining whether the first pattern information matches the second pattern information, according to the first pattern information and the prestored second pattern information for user identity authentication; and
if the target fingerprint is a living body fingerprint and the first pattern information matches the second pattern information, determining that the user identity authentication is successful; or
if the target fingerprint is a living body fingerprint and the first pattern information does not match the second pattern information, or if the target fingerprint is not a living body fingerprint and the first pattern information matches the second pattern information, or if the target fingerprint is not a living body fingerprint and the first pattern information does not match the second pattern information, determining that the user identity authentication is unsuccessful.

19. The electronic device according to claim 18, wherein the computer program, when executed by the processor, causes the electronic device to perform:
determining similarity between the first spectrum information and the second spectrum information according to the first spectrum information and the prestored second spectrum information for user identity authentication; and
if the similarity is greater than or equal to a preset similarity threshold, determining that the target fingerprint is a living body fingerprint; or
if the similarity is less than the preset similarity threshold, determining that the target fingerprint is not a living body fingerprint.

20. The electronic device according to claim 19, wherein the computer program, when executed by the processor, causes the electronic device further to perform:
if the target fingerprint is determined not to be a living body fingerprint for consecutively a preset quantity of times, switching to a password-based user identity authentication mode.

* * * * *